United States Patent [19]
Fujimori et al.

[11] Patent Number: 5,771,084
[45] Date of Patent: Jun. 23, 1998

[54] LIQUID CRYSTAL DISPLAY DEVICE AND METHOD FOR FABRICATING THE SAME

[75] Inventors: Kohichi Fujimori, Nabari; Tokihiko Shinomiya, Nara; Shinji Yamagishi, Osaka; Shuichi Kozaki, Nara, all of Japan

[73] Assignee: Sharp Kabushiki Kaisha, Osaka, Japan

[21] Appl. No.: 810,383

[22] Filed: Mar. 3, 1997

[30] Foreign Application Priority Data

Mar. 5, 1996 [JP] Japan ..................................... 8-047827

[51] Int. Cl.⁶ ........................ G02F 1/1333; G02F 1/1339
[52] U.S. Cl. .......................... 349/153; 349/89; 349/156
[58] Field of Search ..................................... 549/153, 154, 549/156, 86

[56] References Cited

U.S. PATENT DOCUMENTS

| | | | |
|---|---|---|---|
| 5,473,450 | 12/1995 | Yamada et al. | 349/689 |
| 5,608,555 | 3/1997 | Onishi et al. | 349/156 |
| 5,612,803 | 3/1997 | Yamada et al. | 349/156 |
| 5,621,553 | 4/1997 | Nishiguchi et al. | 349/153 |
| 5,636,043 | 6/1997 | Uemura et al. | 349/156 |
| 5,668,651 | 9/1997 | Yamada et al. | 349/156 |

FOREIGN PATENT DOCUMENTS 5-203928  8/1993  Japan .
6-301015  10/1994  Japan .

Primary Examiner—William L. Sikes
Assistant Examiner—Toan Ton
Attorney, Agent, or Firm—Nixon & Vanderhye P.C.

[57] ABSTRACT

A liquid crystal display device of the present invention includes: a pair of substrates at least one of which is transparent; a liquid crystal layer interposed between the substrates and including a plurality of liquid crystal regions substantially surrounded by polymer walls; a sealing agent surrounding a periphery of the liquid crystal layer except for a portion where an injection hole is formed to seal the liquid crystal layer and secure the substrates together; and a sealant for sealing the injection hole, wherein the polymer walls include an ultraviolet light curable resin, and the sealant includes a visible light curable resin.

9 Claims, 4 Drawing Sheets

LIQUID CRYSTAL DISPLAY DEVICE AND METHOD FOR FABRICATING THE SAME

BACKGROUND OF THE INVENTION

1. Field of the Invention

The present invention relates to a liquid crystal display device which can be used for portable information terminals, personal computers, and the like, and a method for fabricating the same.

2. Description of the Related Art

A polymer dispersed liquid crystal (PDLC) mode utilizing a composite film consisting of liquid crystal and a polymer is known as one of the display modes employed for liquid crystal displays. A liquid crystal display device of the PDLC mode (PDLC device) includes a PDLC layer serving as a light modulating layer. The PDLC layer is formed by injecting a mixture including a liquid crystal material, a photopolymerizable composition and a photopolymerization initiator (PDLC precursor mixture) into a space formed between two substrates and irradiating the resultant structure with light to polymerize the photopolymerizable composition. The resultant PDLC layer includes a three-dimensional network structure of transparent solids formed in a continuous layer of the liquid crystal material.

In the fabrication of the PDLC device, an injection hole used for injecting the PDLC precursor mixture into a space between the substrates needs to be sealed with a sealant after the injection. In a conventional method, the injection hole is sealed after the polymerization of the photopolymerizable composition. More specifically, the injected PDLC precursor mixture is irradiated with ultraviolet light to phase-separate the photopolymerizable resin and the liquid crystal material, forming the PDLC layer. Then, a photocurable sealant is applied to the injection hole and irradiated with ultraviolet light to cure the photocurable sealant and thus seal the injection hole.

Japanese Laid-Open Patent Publication No. 5-203928 discloses a method for sealing an injection hole simultaneously with the formation of a PDLC layer. According to this method, after the injection of a PDLC precursor mixture including a photopolymerization initiator sensitive to visible light, a visible light curable sealant is applied to the injection hole. By irradiating the resultant structure with visible light, the injection hole is sealed and a PDLC layer is formed simultaneously.

Methods using a thermocurable sealant, a curable resin which cures by the reaction with the air, such as Alon-alpha. (manufactured by Toa Gosei Chemical Industry Co., Ltd.), and the like have also been studied.

Japanese Laid-Open Patent Publication No. 6-301015 filed by the applicant of the present invention discloses a novel polymer matrix (PM) mode and axially symmetric aligned micro-cell (ASM) mode both using substantially the same precursor mixture as the above PDLC precursor mixture, i.e., a mixture of a liquid crystal material, a photopolymerizable resin and a photopolymerization initiator. The liquid crystal layer for these modes is formed by irradiating the precursor mixture including a liquid crystal material and a photopolymerizable resin with light to lead to photopolymerization-induced phase separation. In the fabrication of liquid crystal devices of these modes, also, an injection hole used for injecting the precursor mixture into a space between substrates needs to be sealed with a sealant after the injection. To seal the injection hole, the inventors of the present invention have employed a method as follows.

That is, an ultraviolet light curable sealant is applied to the injection hole after the injection of the precursor mixture. Then, ultraviolet light is emitted so that only the sealant on the injection hole is irradiated with the light and cured while the precursor mixture is shaded from the light.

The above methods for sealing the injection hole have respective problems as follows.

As for the method where the ultraviolet light curable resin is applied to the injection hole and cured after the injection and curing of the ultraviolet light curable precursor mixture, a portion of the resultant liquid crystal layer near the injection hole is excessively irradiated with ultraviolet light. As a result, the characteristics of this portion of the liquid crystal layer become different from those of the other portion thereof. This lowers the display quality of the device.

As for the method where the visible light curable precursor mixture and the visible light curable sealant are irradiated with visible light and cured simultaneously, the sealant resin comes into contact with the precursor mixture when it is not yet cured. The sealant resin therefore enters the precursor mixture as an impurity. This prevents the formation of a liquid crystal layer with desired characteristics and thus lowers the display quality of the device.

As for the methods where the sealant is cured by heating or reaction with the air, the inside of the sealant is not sufficiently cured. This not only lowers the reliability of the device but also causes inferior orientation of liquid crystal molecules in the liquid crystal layer.

As for the PM and ASM modes utilizing photopolymerization-induced phase separation of the precursor mixture including the liquid crystal material and the photocurable resin, a portion of the photocurable resin in the precursor mixture near the injection hole is polymerized at the irradiation of the ultraviolet light curable sealant with ultraviolet light for sealing the injection hole. As a result, the composition ratio of the liquid crystal material to the photocurable resin in the precursor mixture changes. Thus, a desired liquid crystal layer cannot be formed by the subsequent photopolymerization-induced phase separation by light irradiation. This lowers the display quality of the device.

SUMMARY OF THE INVENTION

The liquid crystal display device of this invention includes: a pair of substrates at least one of which is transparent; a liquid crystal layer interposed between the pair of substrates and including a plurality of liquid crystal regions substantially surrounded by polymer walls; a sealing agent surrounding a periphery of the liquid crystal layer except for a portion where an injection hole is formed to seal the liquid crystal layer and secure the pair of substrates together; and a sealant for sealing the injection hole, wherein the polymer walls include an ultraviolet light curable resin, and the sealant includes a visible light curable resin.

In one embodiment of the invention, each of the plurality of liquid crystal regions is substantially enclosed by the polymer walls and the pair of substrates.

In another embodiment of the invention, liquid crystal molecules in the liquid crystal regions are oriented in a twisted manner.

In still another embodiment of the invention, liquid crystal molecules in the liquid crystal regions are axially-symmetrically oriented.

According to another aspect of the invention, a method for fabricating a liquid crystal display device which includes: a pair of substrates at least one of which is transparent; a liquid crystal layer interposed between the pair of substrates and including a plurality of liquid crystal regions substantially surrounded by polymer walls; a sealing agent surrounding a periphery of the liquid crystal layer except for a portion where an injection hole is formed to seal the liquid crystal layer and secure the pair of substrates together; and a sealant for sealing the injection hole, includes the steps of: injecting a precursor mixture including an ultraviolet light curable resin and a liquid crystal material into a space formed between the pair of substrates via the injection hole; applying the sealant including a visible light curable resin to the injection hole; curing the sealant by irradiating the sealant with visible light; and forming the liquid crystal layer by irradiating the precursor mixture with ultraviolet light to phase-separate the precursor mixture by photopolymerization.

In one embodiment of the invention, the step of forming the liquid crystal layer follows the step of curing the sealant.

In another embodiment of the invention, a wavelength of the visible light is in the range of 400 to 800 nm.

In still another embodiment of the invention, a viscosity of the sealant at room temperature is 2500 mPas or more.

In still another embodiment of the invention, miscibility of the visible light curable resin with the liquid crystal material is lower than that of the ultraviolet light curable resin with the liquid crystal material.

Thus, according to the present invention, the precursor mixture including an ultraviolet light curable resin is injected into a space formed between the pair of substrates via the injection hole, and the sealant containing a visible light curable resin is applied to the injection hole. The sealant is irradiated with visible light and cured before the precursor mixture is phase-separated. Since the resin in the precursor mixture is ultraviolet curable, the portion of the precursor mixture adjacent to the sealant is not polymerized with the visible light of which energy is lower than that of ultraviolet light at the irradiation of the sealant. Accordingly, the composition ratio of the liquid crystal material to the ultraviolet light curable resin of the precursor mixture does not change, allowing a liquid crystal layer with desired characteristics to be formed by the subsequent ultraviolet light irradiation. The "photocurable resin" as used herein is broadly defined to include a resin composition which is cured with light irradiation, including a composition which forms a crosslinking structure, a composition which linearly polymerizes, and a mixture thereof.

Thus, the invention described herein makes possible the advantages of (1) providing a liquid crystal display device with uniform display quality and excellent reliability, and (2) providing a method for fabricating such a liquid crystal display device.

These and other advantages of the present invention will become apparent to those skilled in the art upon reading and understanding the following detailed description with reference to the accompanying figures.

DESCRIPTION OF THE PREFERRED EMBODIMENTS

Hereinbelow, illustrative but by no means restrictive examples of the present invention will be described.

(Example 1)

Figure 1A:
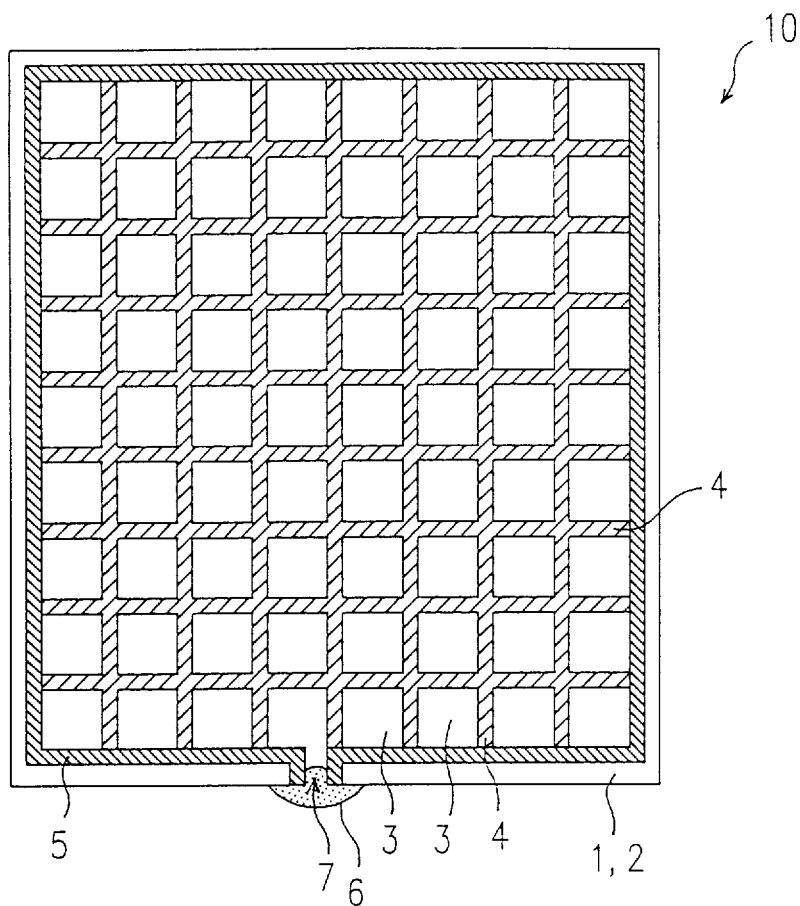
FIGS. 1A and 1B are a schematic top view and a schematic sectional view, respectively, of a liquid crystal display device of Example 1 according to the present invention.
Figure 1B:
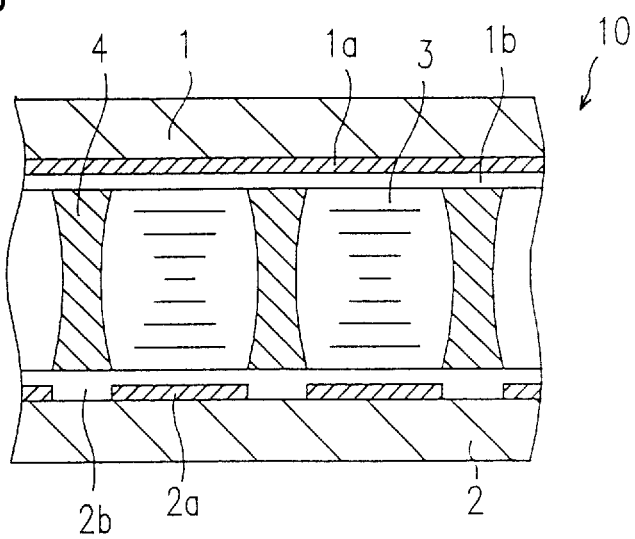

FIGS. 1A and 1B are a schematic top view and a schematic sectional view, respectively, of a liquid crystal display device 10 of Example 1 according to the present invention.

The liquid crystal display device 10 includes a pair of glass substrates 1 and 2 and a liquid crystal layer interposed therebetween. The liquid crystal layer is surrounded by a sealing agent 5 except for a portion thereof where an injection hole 7 is formed. The sealing agent 5 defines the area where the liquid crystal layer is formed and also secures the pair of substrates 1 and 2 together. The injection hole 7 is sealed with a visible light curable sealant 6. The liquid crystal layer includes a plurality of liquid crystal regions 3 substantially surrounded by polymer walls 4 which are made of an ultraviolet light curable resin. In this example, the individual liquid crystal regions 3 are substantially enclosed by the polymer walls 4 and the substrates 1 and 2. Transparent electrodes 1a and 2a and alignment films 1b and 2b are formed on the surfaces of the substrates 1 and 2 facing the liquid crystal layer. Liquid crystal molecules in each liquid crystal region 3 are oriented in a twisted manner. In this example, the twisting angle is set in the range of 900 to 2700 for supertwisted nematic (STN) liquid crystal. The liquid crystal display device 10 is of a transmission type. In the case of fabricating a reflection type liquid crystal display device, an opaque substrate such as a semiconductor substrate may be used as one of the pair of substrates.

A method for fabricating the liquid crystal display device 10 will now be described.

A transparent conductive layer made of ITO (indium tin oxide) is formed on each of the glass substrates 1 and 2 by sputtering or the like, and then patterned by photolithography to form the strip-shaped transparent electrodes 1a or 2a. Insulating films (not shown) and the alignment films 1b and 2b are formed on the transparent electrodes 1a and 2a. In this example, the alignment films 1b and 2b are rubbed so that STN orientation of liquid crystal molecules is obtained. The insulating films and the alignment films 1b and 2b may be formed of known materials by known methods, or they may be omitted depending on the structure of the liquid crystal display device.

The resultant substrates 1 and 2 are disposed to face each other with spacers interposed therebetween so that the strip-shaped transparent electrodes 1a and 2a of the substrates 1 and 2 are positioned to cross each other, and laminated together with the sealing agent 5. The injection hole 7 is formed through a portion of the sealing agent 5 for the injection of a precursor mixture.

As the precursor mixture, any mixture where a liquid crystal material, a photocurable resin and a photopolymerization initiator are uniformly mixed can be used. The photopolymerization initiator may be omitted depending on the type of the photocurable resin, the wavelength and intensity of light for curing, and the like.

Typical examples of materials to be used in this example are as follows.

Liquid crystal material: ZLI-4427 (manufactured by Merck & Co., Ltd.) for STN containing an appropriate amount of chiral agent CN Photocurable resin: stearyle acrylate and R-684 (manufactured by Nippon Kayaku Co., Ltd.)

Photopolymerization initiator: Irgacure 651 (manufactured by Ciba Geigy Co., Ltd.) having absorption for light with a wavelength of 365 nm which is within the ultraviolet light range The precursor mixture is obtained by mixing the above materials sufficiently and uniformly. The resultant precursor mixture is injected into a space between the substrates 1 and 2 via the injection hole 7 by a known vacuum injection method.

After the injection, the visible light curable sealant 6 is applied to the injection hole 7. Any known visible light curable sealant may be used. In this example, typical LOCTITE 3211 (manufactured by Loctite (Japan) Corporation) is used.

Figure 2:
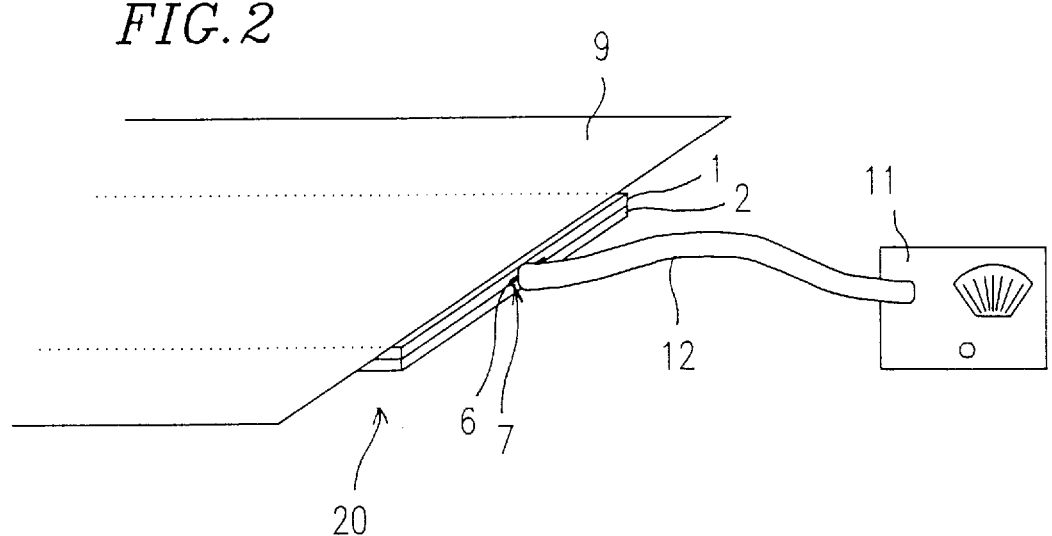
FIG. 2 is a schematic view illustrating a step of irradiating a sealant on an injection hole with visible light.

Visible light with a wavelength of around 450 nm is emitted to irradiate the sealant 6. As a light source, LUXPOT (manufactured by ICI-Pharma Ltd.), for example, is used by cutting ultraviolet light with a wavelength of 400 nm or less through a filter. As shown in FIG. 2, light is preferably guided to the sealant 6 applied on the injection hole 7 through an optical fiber 12 from a visible light source 11. In this case, the display portion of a liquid crystal cell 20 is optionally covered with a light-shading plate 9, for example, so that the precursor mixture in the display portion is shaded from the light. In the case where multiple injection holes are formed in a liquid crystal cell and sealed, the liquid crystal cell is preferably irradiated with light to seal the injection holes while shading the portions of the liquid crystal cell other than the injection holes from light.

As described above, an ultraviolet light curable resin is used as the photocurable resin included in the precursor mixture, while a visible light curable resin is used as the sealant. Accordingly, the injection hole 7 can be sealed with little affect on the precursor mixture in the display portion.

Figure 3:
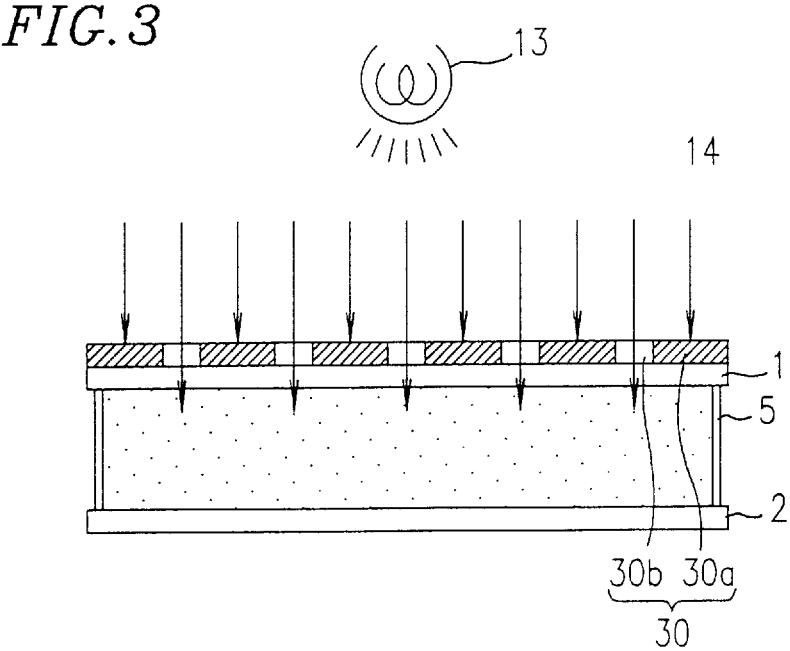
FIG. 3 is a view illustrating a method for forming a liquid crystal layer having liquid crystal regions and polymer walls according to the present invention.

Thereafter, the precursor mixture is irradiated with light having an intensity distribution to phase-separate the liquid crystal material and the photocurable resin in the precursor mixture so that the liquid crystal regions corresponding to pixel portions and the polymer walls corresponding to non-pixel portions are formed in the liquid crystal layer. This is typically performed by a method as shown in FIG. 3, for example, where a photomask 30 composed of light-shading portions 30a and transparent portions 30b is disposed on the outer surface of the substrate 1 (or 2) and irradiated with light. Alternatively, a color filter or the transparent electrodes formed on the substrate 1 or 2 may be used as a photomask. An ultra-high voltage mercury lamp 13 is used as a light source for emitting ultraviolet light 14 with a wavelength of 365 nm which is within the ultraviolet light range and a brightness of 7 mW/cm$^2$, for example. The irradiation with ultraviolet light is preferably performed at a temperature equal to or higher than the temperature when the precursor mixture turns to an isotropic liquid status. At this temperature, the separation between the liquid crystal material and the photocurable resin improves.

The liquid crystal material and the photocurable resin can be phase-separated clearly by gradually cooling the liquid crystal cell to around room temperature after the irradiation with ultraviolet light, so that the liquid crystal regions having desired STN orientation and the polymer walls of the photocurable resin can be obtained. After the phase separation, the liquid crystal cell may be irradiated again with light with a weak brightness for a short time period to further enhance the polymerization (crosslinking) level of the photocurable resin.

The orientation of the liquid crystal molecules in a portion of the resultant liquid crystal cell near the injection hole was observed with a microscope. As a result, good STN orientation of the liquid crystal molecules was observed with little disturbance on the orientation.

(Example 2)

Figure 4:
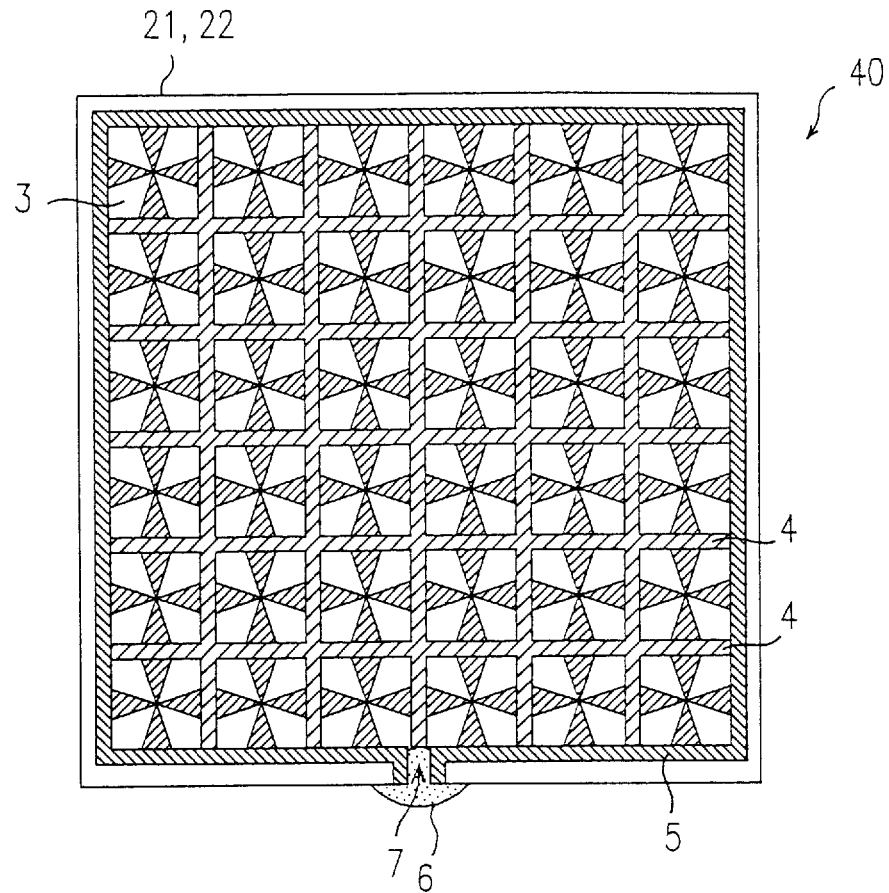
FIG. 4 is a top view of a liquid crystal device of Example 2 according to the present invention.

FIG. 4 schematically shows a liquid crystal display device 40 of Example 2 according to the present invention. The liquid crystal display device 40 includes a pair of substrates 21 and 22 and a liquid crystal layer interposed therebetween. The liquid crystal layer is surrounded with a sealing agent 5 except for a portion thereof where an injection hole 7 is formed. The sealing agent 5 defines the area where the liquid crystal layer is formed and also secures the pair of substrates 21 and 22 together. The injection hole 7 is sealed with a visible light curable sealant 6. The liquid crystal layer includes a plurality of liquid crystal regions 3 substantially surrounded by polymer walls 4 which are made of an ultraviolet light curable resin. Liquid crystal molecules in each liquid crystal region 3 are axially-symmetrically oriented. In FIG. 4, alignment films, electrodes for applying a voltage to the liquid crystal layer, and the like are omitted for simplification.

Hereinbelow, a method for fabricating the liquid crystal display device 40 will be described.

Thin film transistors (TFTs) and pixel electrodes made of ITO are formed on a surface of one of the glass substrates 21 and 22, while counter electrodes (common electrodes) made of ITO are formed on a surface of the other substrate. The TFTs may be formed of known material and the TFTs and the electrodes may be formed by known methods.

The two substrates 21 and 22 are laminated together with the sealing agent 5 with spacers interposed therebetween. The injection hole 7 is formed through a portion of the sealing agent 5 for the injection of a precursor mixture.

As the precursor mixture, any mixture where a liquid crystal material, a photocurable resin and a photopolymerization initiator are uniformly mixed can be used. The photopolymerization initiator may be omitted depending on the type of the photocurable resin, the wavelength and intensity of light for curing, and the like.

Typical examples of materials to be used in this example are as follows.

Liquid crystal material: ZLI-4792 (manufactured by Merck & Co., Ltd.) for a TFT-LCD containing an appropriate amount of chiral agent CN Photocurable resin: perfluorooctylethyl acrylate, 2-ethylhexyl acrylate, p-phenylstyrene, and R-684 (manufactured by Nippon Kayaku Co., Ltd.)

Photopolymerization initiator: Irgacure 651 (manufactured by Ciba Geigy Co., Ltd.) having absorption for light with a wavelength of 365 nm which is within the ultraviolet light range The precursor mixture is obtained by mixing the above materials sufficiently and uniformly. The resultant precursor mixture is injected into a space between the pair of substrates 21 and 22 via the injection hole 7 by a known vacuum injection method.

After the injection, the visible light curable sealant 6 is applied to the injection hole 7. Any known visible light curable sealant may be used. In this example, typical LOCTITE 3211 (manufactured by Loctite (Japan) Corporation) is used.

Light with a wavelength of around 450 nm is emitted to irradiate the sealant 6. As a light source, LUXPOT (manufactured by ICI-Pharma Ltd.), for example, is used by cutting ultraviolet light with a wavelength of 400 nm or less through a filter. As shown in FIG. 2, light is preferably guided to the sealant 6 applied on the injection hole 7 through an optical fiber 12 from a visible light source 11. In this case, the display portion of a liquid crystal cell 20 is optionally covered with a light-shading plate 9 so that the precursor mixture in the display portion is shaded from the light. In the case where multiple injection holes are formed in a liquid crystal cell and sealed, the liquid crystal cell is preferably irradiated with light to seal the injection holes while shading the portions of the liquid crystal cell other than the injection holes from light.

As described above, an ultraviolet light curable resin is used as the photocurable resin included in the precursor mixture, while a visible light curable resin is used as the sealant. Accordingly, the injection hole can be sealed with little affect on the precursor mixture in the display portion.

Figure 5:
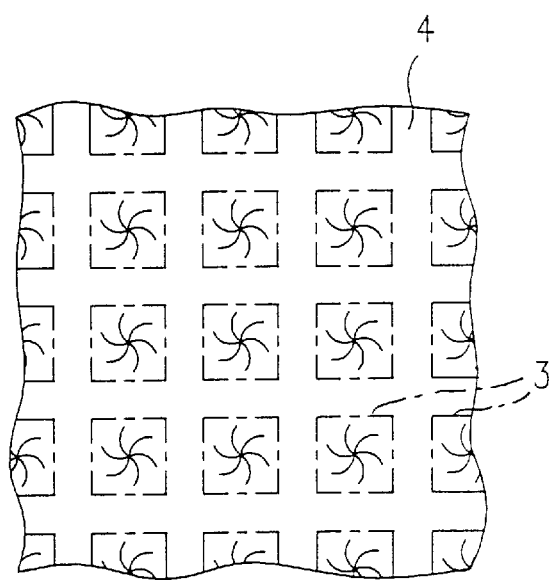
FIG. 5 is a schematic view showing axially symmetric orientation in each liquid crystal region of a liquid crystal layer of the liquid crystal device of Example 2.

Thereafter, the precursor mixture is irradiated with light having an intensity distribution to phase-separate the liquid crystal material and the photocurable resin in the precursor mixture so that the liquid crystal regions corresponding to pixel portions and the polymer walls corresponding to non-pixel portions are formed in the liquid crystal layer. This is typically performed by a method as shown in FIG. 3, for example, where a photomask 30 composed of light-shading portions 30a and transparent portions 30b is disposed on the outer surface of the substrate 1 (or 2) and irradiated with light. Alternatively, a color filter or the transparent electrodes formed on the substrate 1 or 2 may be used as a photomask. An ultra-high voltage mercury lamp 13 is used as a light source for emitting ultraviolet light 14 with a wavelength of 365 nm which is within the ultraviolet light range and a brightness of 7 mW/cm², for example. The irradiation with ultraviolet light is preferably performed at a temperature equal to or higher than the temperature when the precursor mixture turns to an isotropic liquid status. At this temperature, the separation between the liquid crystal material and the photocurable resin improves. FIG. 5 shows the status of the liquid crystal layer exhibited immediately after the start of the phase separation of the precursor mixture induced by the irradiation with ultraviolet light.

The liquid crystal material and the photocurable resin can be phase-separated clearly by gradually cooling the liquid crystal cell to around room temperature after the irradiation with ultraviolet light, so that the liquid crystal regions having desired axially symmetric orientation and the polymer walls made of photocurable resin can be obtained. The cooling rate is preferably in the range of 3° C./h to 10° C./h, more preferably in the range of 4° C./h to 5° C./h. After the phase separation, the liquid crystal cell may be irradiated again with light with a weak brightness for a short time period to further enhance the polymerization (crosslinking) level of the photocurable resin.

The orientation of the liquid crystal molecules in a portion of the liquid crystal cell near the injection hole was observed with a microscope. As is shown in FIG. 5, the liquid crystal molecules in each liquid crystal region is oriented in a helical shape having the center axis of the liquid crystal region as the axis of axial symmetry. As a result, good axially symmetric orientation of the liquid crystal molecules as shown in FIG. 5 was observed with little disturbance of the orientation. The orientation of the liquid crystal molecules in this example may be of any other shape as long as it is axially symmetric. For example, they may be oriented in a concentric shape or a radial shape. By forming liquid crystal regions with axially symmetric orientation, a liquid crystal display device with excellent viewing angle characteristics can be obtained.

The visible light curable sealant used in the present invention includes a visible light curable resin as a main component and optionally another additive and a filler. The viscosity of the sealant at room temperature is preferably 2500 mPas or more to avoid uncured visible light curable resin from entering the precursor mixture as an impurity. The viscosity of LOCTITE 3211 used in the above examples at room temperature is about 10000 mpas.

The missibility of the visible light curable resin with the liquid crystal material is preferably lower than that of the ultraviolet light curable resin in the precursor mixture with the liquid crystal material. Examples of such a sealant include LOCTITE 350, LOCTITE 3521 and LOCTITE 363, in addition to the above-mentioned LOCTITE 3211. A photopolymerization initiator which is activated with light with a wavelength within the visible light range may be optionally added to the sealant. A substance having absorption for light with a wavelength in the range of 400 to 800 nm can be used as the photopolymerization initiator which is sensitive to the visible light emitted to the sealant and generates radicals. For example, a dicarbonyl compound and a thioxanthon compound are effective.

The visible light used for the curing of the sealant is preferably obtained by cutting light components with wavelengths of 400 nm or less from light generated by a xenon lamp or a halogen lamp. This is because a photopolymerization initiator having main absorption for light with a wavelength around 365 nm is often used as the photopolymerization initiator included in the precursor mixture. Using such a photopolymerization initiator, the photocurable resin in the display portion can be prevented from polymerizing when the sealant is cured.

(Comparative Example)

Figure 6:
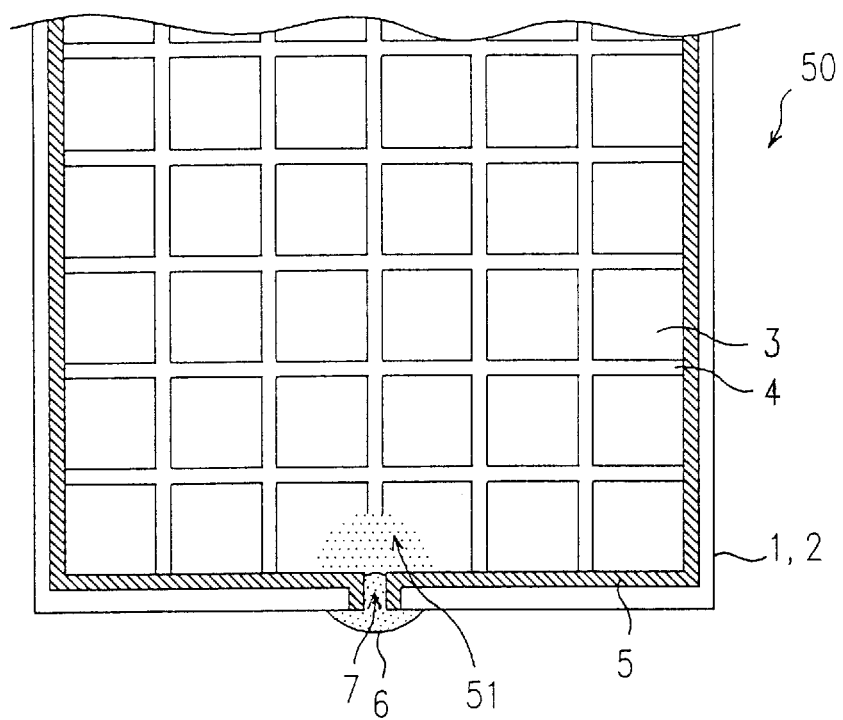
FIG. 6 is a schematic view of a liquid crystal display device of Comparative Example, where PDLC-like inferior orientation is observed near an injection hole.

FIG. 6 shows a liquid crystal display device 50 of this comparative example. The liquid crystal display device 50 was fabricated by phase-separating the liquid crystal material and the photocurable resin by photopolymerization in the same manner as that described in Example 1, except that the sealant of Example 1 was replaced with ultraviolet light curable TB 3054 (manufactured by Three Bond Co., Ltd.).

As shown in FIG. 6, a PDLC-like inferior orientation region 51 was observed near an injection hole 7 of the resultant liquid crystal display device 50. Also, a region where the voltage value at which the orientation of liquid crystal molecules changes (threshold value) is extremely low was observed. These clearly indicate that the display material (precursor mixture) and the sealant material were mixed in the display portion before or after the curing of the sealant material, and thus the phase separation between the liquid crystal material and the photocurable resin was blocked, resulting in incomplete phase separation.

Thus, according to the present invention, by using a visible light curable resin for the sealant for the injection hole, the sealant can be cured without curing the precursor mixture including the ultraviolet light curable resin and the liquid crystal material when the sealant is irradiated with visible light. As a result, the orientation of the liquid crystal molecules in each liquid crystal region of the liquid crystal layer of the PM mode and the ASM mode, as well as the formation of the polymer walls surrounding the liquid crystal regions, are ensured to be uniform as a whole. Thus, a liquid crystal display device with uniform display quality and excellent reliability can be obtained. Also, according to the present invention, the sealant can be applied and cured immediately after the injection of the precursor mixture. Therefore, the subsequent phase separation of the precursor mixture can be performed without being interrupted by the generation of bubbles and the entering of oxygen via the injection hole.

In the above examples, the case of the PM mode or the ASM mode where the polymer walls extend over the thickness of the liquid crystal layer to enclose the liquid crystal regions together with the two substrates facing to each other was described. The present invention can also be applicable to the PDLC mode where liquid crystal regions surrounded by polymer walls are randomly dispersed in a liquid crystal layer. In this case, also, a liquid crystal display device with uniform display quality and excellent reliability can be obtained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising:

a pair of substrates at least one of which is transparent;

a liquid crystal layer interposed between the pair of substrates and including a plurality of liquid crystal regions substantially surrounded by polymer walls;

a sealing agent surrounding a periphery of the liquid crystal layer except for a portion where an injection hole is formed to seal the liquid crystal layer and secure the pair of substrates together; and a sealant for sealing the injection hole, wherein the polymer walls include an ultraviolet light curable resin, and the sealant includes a visible light curable resin.

2. A liquid crystal display device according to claim 1, wherein each of the plurality of liquid crystal regions is substantially enclosed by the polymer walls and the pair of substrates.

3. A liquid crystal display device according to claim 2, wherein liquid crystal molecules in the liquid crystal regions are oriented in a twisted manner.

4. A liquid crystal display device according to claim 2, wherein liquid crystal molecules in the liquid crystal regions are axially-symmetrically oriented.

5. A method for fabricating a liquid crystal display device including: a pair of substrates at least one of which is transparent; a liquid crystal layer interposed between the pair of substrates and including a plurality of liquid crystal regions substantially surrounded by polymer walls; a sealing agent surrounding a periphery of the liquid crystal layer except for a portion where an injection hole is formed to seal the liquid crystal layer and secure the pair of substrates together; and a sealant for sealing the injection hole, the method comprising the steps of:

injecting a precursor mixture including an ultraviolet light curable resin and a liquid crystal material into a space formed between the pair of substrates via the injection hole;

applying the sealant including a visible light curable resin to the injection hole;

curing the sealant by irradiating the sealant with visible light; and forming the liquid crystal layer by irradiating the precursor mixture with ultraviolet light to phase-separate the precursor mixture by photopolymerization.

6. A method according to claim 5, wherein the step of forming the liquid crystal layer follows the step of curing the sealant.

7. A method according to claim 5, wherein a wavelength of the visible light is in the range of 400 to 800 nm.

8. A method according to claim 5, wherein a viscosity of the sealant at room temperature is 2500 mpas or more.

9. A method according to claim 5, wherein missibility of the visible light curable resin with the liquid crystal material is lower than that of the ultraviolet light curable resin with the liquid crystal material.

* * * * *